United States Patent

[11] 3,610,968

[72] Inventor Toshiyuki Yamada
Yokohama, Japan
[21] Appl. No. 44,375
[22] Filed June 8, 1970
[45] Patented Oct. 5, 1971
[73] Assignee Sony Corporation
Tokyo, Japan
Continuation-in-part of application Ser. No. 673,658, Oct. 9, 1967, now Patent No. 3,519,899.

[54] MAGNETORESISTANCE CIRCUITS AND ELEMENTS
8 Claims, 33 Drawing Figs.

[52] U.S. Cl. ........ 307/309, 307/256, 307/278, 307/299
[51] Int. Cl. ........ H01l15/00, H01r 5/00
[50] Field of Search ........ 307/309, 299, 256, 278; 317/235 H, 235 AD

[56] References Cited

UNITED STATES PATENTS 3,158,754 11/1964 Yu ........ 317/235

*Primary Examiner*—Donald D. Forrer
*Assistant Examiner*—B. P. Davis
*Attorney*—Hill, Sherman, Meroni, Gross and Simpson

ABSTRACT: This invention discloses circuits utilizing magnetoresistance devices such as diodes and transistors with asymmetrical responses in the presence of a magnetic field connected in combinations so that the presence of a magnetic field can be detected, or alternatively, so that the circuit may be switched between one or more states when a field is present.

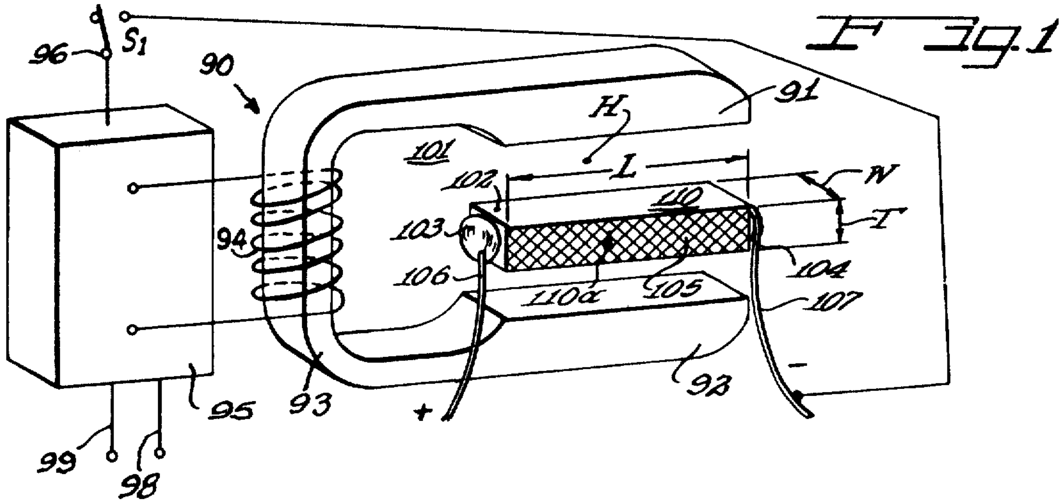
Fig.2
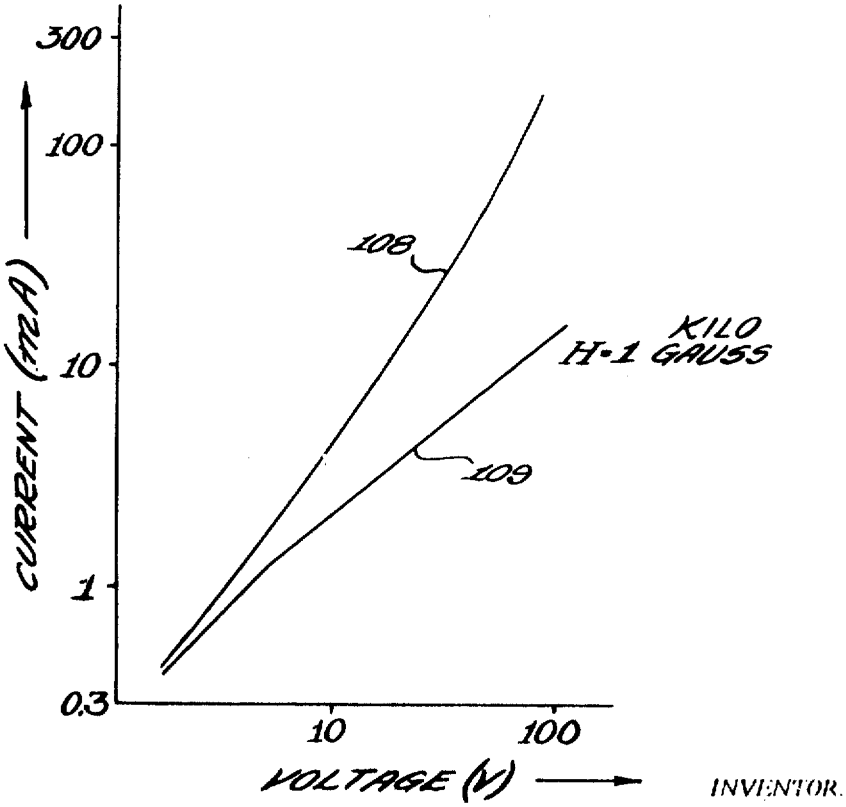
INVENTOR.
Toshiyuki Yamada
BY Hill, Sherman, Meroni, Gross & Simpson ATTORNEYS INVENTOR.
Toshiyuki Yamada
BY Hill, Sherman, Meroni, Gross & Simpson ATTORNEYS

INVENTOR.

Toshiyuki Yamada

BY [signature] ATTORNEYS

12-A, 12-B, 12-C, 12-D, 12-E, 12-F, 12-G, 12-H

INVENTOR

Toshiyuki Yamada

BY Hill, Sherman, Meroni, Gross & Simpson ATTORNEYS

INVENTOR.

Toshiyuki Yamada

BY Hill, Sherman, Meroni, Gross & Simpson

ATTORNEYS

INVENTOR.

Toshiyuki Yamada

BY Kill, Sherman, Meroni, Gross & Simpson

ATTORNEYS

MAGNETORESISTANCE CIRCUITS AND ELEMENTS

CROSS-REFERENCE TO RELATED APPLICATIONS

This application is a continuation-in-part of copending application Ser. No. 673,658 filed Oct. 9, 1967 now U.S. Pat. No. 3,519,899.

BACKGROUND OF THE INVENTION

This invention relates to a magnetoresistance element and more particularly to a magnetoresistance element exhibiting excellent characteristics in low-intensity magnetic fields.

In recent years there has sprung up the demand for a device capable of detecting or sensing and indicating the presence of a magnetic field of 1 kilogauss or so in the form of an electrical on-off signal. To comply with such requirement, the so-called reed relay has been employed in the art which involves mechanical switching of a circuit used in response to the presence of a magnetic field. However, such mechanical switching leads to shortening of the life of the reed relay due to wear of its contacts and introduces undesirable phenomena such as noise and so on resulting from contact chatter, discharge and the like.

In order to avoid such drawbacks, a Hall-effect element has been proposed as an electromagnetic transducer element employing a semiconductor. However, under a low magnetic field intensity condition such, for example, as 1 kilogauss the Hall-effect element yields too small an output of, for instance, only several 10 millivolts, and hence this type of Hall-effect element is not suitable for use in low-intensity magnetic fields. Besides, devices utilizing the Suhl effect, magnetoresistance effect and the like have also been proposed but they are all poor in output under low magnetic field intensities.

I have succeeded in the making of a magnetoresistance element free from the defect experienced in the prior art devices, which is formed of an intrinsic semiconductor and includes a P-type region and an N-type region provided on selected areas of the intrinsic semiconductor for injection of carriers of electrons and holes thereinto and a recombination region formed on a selected area of the intrinsic semiconductor.

The word "intrinsic" referred to in this specification implies that the electrons and holes, in the thermal equilibrium, have respective concentration of the same order of magnitude; that is, the concentration of the electrons is at most about 10 times the concentration of the holes, or vice versa. However, the concentrations of the electrons and the holes are desirable to be on substantially the same order for obtaining the best characteristics.

Upon application of a magnetic field to the magnetoresistance element of this invention, carriers are deflected toward the recombination region to decrease the carrier concentration in the intrinsic semiconductor and hence lower the output current. With the decrease of the output current, voltages applied to P–I and N–I junctions also decrease to lower the injection efficiency, so that the resistance of the intrinsic semiconductor is enhanced due to an effect just like a positive feedback. In the present invention the concentrations of the electrons and holes in the intrinsic semiconductor are selected in a predetermined relation so as to minimize the Hall-effect and enhance efficiency under low magnetic field intensity.

Accordingly, one object of this invention is to provide a novel magnetoresistance element which efficiently operates in a magnetic field of less than 1 kilogauss.

Another object of this invention is to provide a novel magnetoresistance element whose output reversibly varies with the direction of applied magnetic fields.

Still another object of this invention is to provide a magnetoresistance element integrated with a transistor.

Other objects, features and advantages of this invention will become apparent from the following description taken in conjunction with the accompanying drawings.

BRIEF DESCRIPTION OF THE DRAWINGS

FIG. 1 is an enlarged perspective view schematically illustrating one example of a magnetoresistance element produced according to this invention;

FIG. 2 is a graph showing the voltage-current characteristic of the magnetoresistance element of this invention;

FIGS. 19A to 19D, inclusive, are graphs showing the variations in the resistance of the magnetoresistance element of this invention in response to the magnetic field intensity;

DESCRIPTION OF THE PREFERRED EMBODIMENTS

Figure 3:
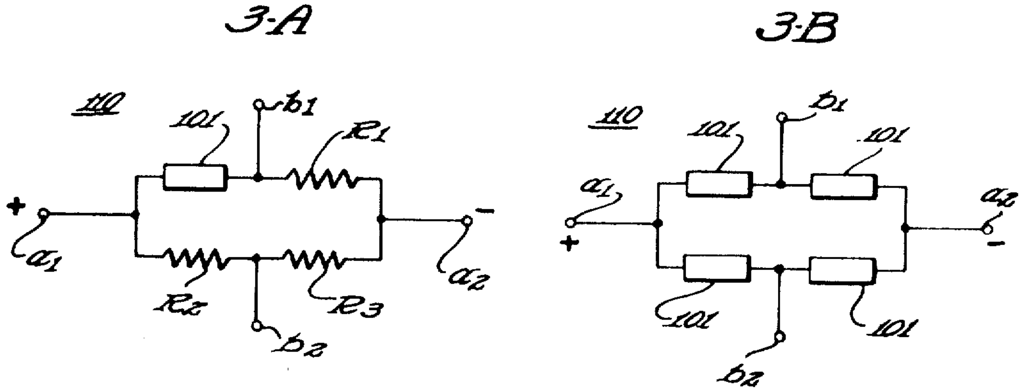
FIGS. 3A and 3B are connection diagrams illustrating examples of a bridge circuit employing the magnetoresistance element of this invention.

In FIG. 1 reference numeral 101 indicates generally a magnetoresistance element produced according to this invention. The magnetoresistance element 101 is formed of an intrinsic germanium substrate 110 into which carriers or holes and electrons can be sufficiently injected, for example, at room temperature. The substrate 110 is configured in a rectangular parallelepiped shape which is approximately 1 mm. in thickness T and in width W and is about 5 mm. in length L, and these dimensions may be selected at will in accordance with the characteristics of the magnetoresistance element desired to be produced. On both end faces of the substrate 110, for example, in the lengthwise direction thereof, there are formed P- and N-type regions 103 and 104 or relatively high impurity concentrations. Accordingly, the magnetoresistance element 101 of this invention comprises an intrinsic region 102 into which carriers can be sufficiently injected and the P- and N-type regions 103 and 104 of relatively high impurity concentrations which are located on the both end faces of the intrinsic region 102 in opposing relation to each other and facilitates efficient injection of the carriers into the intrinsic region 102.

The formation of the P- and N-type regions 103 and 104 on the intrinsic region 102 may take place by means of an alloying, a diffusion, an epitaxial growth method or the like. Namely, the P-type region 103 can be formed on one end of the germanium substrate 110 by alloying an In–Ga alloy therewith and the N-type region 104 can similarly be formed on the other end of the germanium substrate 110 by alloying an Sn–Sb alloy therewith, as illustrated. The P- and N-type regions 103 and 104 need not be always located on the both ends of the intrinsic regions 102. The only requirement for the relative positioning of the P- and N-type regions is such that the distance L therebetween is greater than $L_{Dn}+L_{Dp}$, $L_{Dn}$ and $L_{Dp}$ being diffusion distances of the carriers from the N- and P-type regions respectively.

In the present invention a recombination region 105 is formed locally in the intrinsic region 102, where the recombination velocity of the carriers is great. The recombination region 105 is provided on one side 110a of the germanium substrate 110 extending between the P- and N-type regions 103 and 104, as shown in the figure. The recombination region 105 may be formed by roughening or polishing, for example, the side 110a of the germanium substrate 110 by means of a sandpaper or the like or by a sandblast method to disturb the regularity of the lattice in the substrate 110 for increasing the recombination 37 velocity. Otherwise, an impurity such as Cu, Au, Fe or the like, commonly referred to as "deathnium," which forms a recombination center, is diffused into the germanium substrate 110 from its side 110a to form an increased recombination layer, thus providing the recombination region 105. The increased recombination layer need not be always positioned on the surface of the intrinsic region 102 and it may be located in the body of the intrinsic region 102. Further, the formation of the recombination region can also be accomplished by the following method. Namely, since the semiconductor is great in recombination velocity on the surface in itself, the germanium substrate 110 forming the intrinsic region 102 is configured, for example, triangular in cross section so as to be asymmetrical with respect to the direction of a magnetic field applied thereto and the portion of greater surface area along one edge of the triangle can be utilized as the recombination region 105. It will be understood that the recombination region 105 may also be provided by the combined use of the aforementioned methods. Reference numerals 106 and 107 indicate lead wires connected to the P- and N-type regions 103 and 104 respectively in the manner of ohmic contacts.

The magnetoresistance element 101 of such construction is supplied with a forward voltage, namely a positive potential is applied to the lead wire 106 and a negative potential is applied to the lead wire 107 respectively. Thus, holes and electrons are injected into the intrinsic region 102 through the P- and N-type regions 103 and 104 respectively, which introduces conductivity modulation in the intrinsic region 102 to cause a great flow of current passing therethrough. Under such conditions, upon applying a magnetic field H to the intrinsic region 102 in a direction substantially at right angles to the direction of the current flow therethrough, the electrons and holes are deflected in the same direction. In this case, if the magnetic field H is selected so that the electrons and holes are directed toward the recombination region 105, the electrons and holes are rapidly recombined with one another to be neutralized in the recombination region 105, to thereby cause a decrease in the current, which in turn leads to an increase in the resistance of the intrinsic region 102.

With the increase in the resistance of the intrinsic region by the magnetic field H, voltages applied to the junctions formed between the P- and N-type regions 103 and 104 and the intrinsic region 102 decreases correspondingly to lower the injection efficiency of the electrons and holes, with the result that the resistance of the intrinsic regions 102 is increasingly enhanced. That is, one of the features of the magnetoresistance element 101 resides in the production of such an effect as is similar to the so-called positive feedback and it must be noted that this effect enhances the sensitivity of the magnetoresistance element 101. When a Hall voltage is produced by the magnetic field H, it yields a force acting in a direction opposite to that of the carriers directed toward the recombination region 105, lowering the sensitivity of the magnetoresistance element 101. Therefore, it is desired to minimize the possibility of producing the Hall voltage. It is generally known in the art to select a relation $(n+p)/(n-p)>>1$ for the purpose of avoiding the adverse effect resulting from the Hall voltage, $n$ and $p$ being the numbers of the electrons and the holes per unit volume in the intrinsic region 102.

If now the numbers of the electrons and the holes per unit volume present in the intrinsic region 102 are $n_o$ and $p_o$ and the numbers of those electrons and holes per unit volume which have been injected into the intrinsic region 102 from the N- and P-type regions 104 and 103 are $n'$ and $p'$, and they are selected, for example, as follows:

$$n_o=1\times10^{13}\text{ cm.}^{13}$$
$$p_0=0.9\times10^{13}\text{ cm.}^{13}$$
$$n'=p'=10\times10^{13}\text{ cm.}^{13}$$

it follows that $$n=n'+n_0=11\times10^{13}$$
$$p=p'+p_0=10.9\times10^{13}$$

Therefore, it follows that $$(n+p)/(n-p)=(21.9\times10^{13})/(0.1\times10^{13})=219$$

If, however, the N- and P-type regions 104 and 103 are not present and neither electrons nor holes are injected into the intrinsic region 102, $$n=n^0$$
$$p=p_0$$

and accordingly it follows that $$(n+p)/(n-p)=(n_o+p_o)/(n_o-p_o)=1.9/0.1=19$$

Hence, the positive injection of the holes and the electrons into the intrinsic region 102 from the P- and N-type regions 103 and 104 relatively lowers the effect of the Hall voltage, and another feature of this invention lies in this point. The magnetoresistance element 101 described above is constructed so that the holes and the electrons are injected into the intrinsic region 102 from the P- and N-type regions 103 and 104. In other words, the present invention is highly significant in practice in that even if a nonintrinsic semiconductor is employed in the thermal equilibrium, sufficient injection of the holes and electrons thereinto ensures elimination of the adverse effect based upon the Hall voltage. That is, in the case of using, for instance, a silicon semiconductor, it is usually difficult to obtain intrinsic silicon semiconductor at room temperature, but in this invention the holes and electrons can be made equal in number by the injection thereof to avoid adverse effect from the Hall voltage as has been described in the foregoing.

A magnetic field producing device 90 is mounted with pole pieces 91 and 92 on opposite sides of magnetoresistance element 101. An arm 93 joins pole pieces 91 and 92 and an excitation winding 94 is mounted on the arm to generate a magnetic field.

A control and energizing device 95 is connected to the winding 94. An input terminal 96 is connected to the device 95 and may receive a feedback control signal to allow the apparatus of this invention to operate as an oscillator or amplifier as will become more clear from the following specification. Power is supplied to control device 95 through suitable power leads 99 and 98 from a suitable power source, not shown.

In FIG. 2 there is illustrated a graph showing the current variations in the aforementioned magnetoresistance element 101 when subjected to a magnetic field of 1 kilogauss, in which reference numeral 108 designates a voltage-current characteristic curve obtained in the absence of a magnetic field and reference numeral 109 a voltage-current characteristic curve in the presence of the magnetic field of 1 kilogauss. As is apparent from the graph, when the magnetoresistance element 101 is subjected to the magnetic field of 1 kilogauss, its resistance variation at 100 v. is 15 times that caused in the absence of the magnetic field, and when the voltage is as low as 10 v. the resistance of the element 101 is twice that when no magnetic field is applied. These resistance variations are very great, as compared with those obtainable with the prior art magnetoresistance elements.

On the other hand, when the magnetic field H is applied to the magnetoresistance element 101 in a direction opposite to the aforementioned one to direct the carriers toward the opposite side from the recombination region 105, the current path generally goes away from the recombination region 105, so that the destruction of the carriers in the intrinsic region 102 can be reduced. This prolongs the mean carrier life and, as a result, the current passing through the magnetoresistance element 101 increases and produces negative magnetoresistance. In this case, if the shape of the element 101 and the ratio of the surface recombination velocities are selected suitable, it is possible to obtain magnetoresistance variations of the negative characteristic with substantially the same value as that of the magnetoresistance variations of the positive characteristic at the time of reversal of the magnetic field applied.

Figure 4:
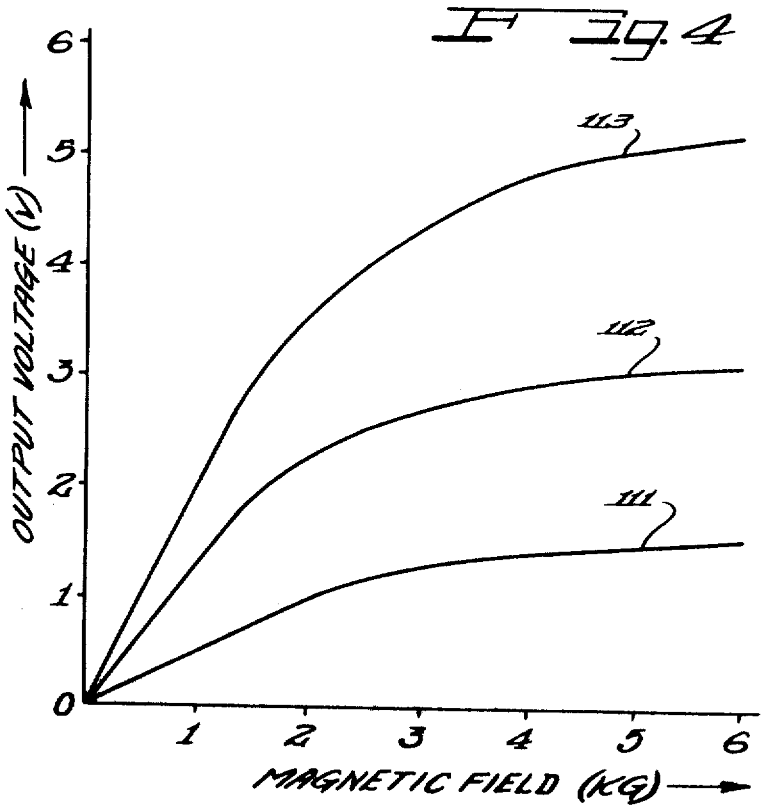
FIG. 4 is a graph showing the magnetic field-output characteristic of the bridge circuit exemplified in FIG. 3A.

As has been described in the foregoing, the magnetoresistance element 101 of this invention is excellent in linearity and variation rate under low magnetic field intensity, as compared with the conventional magnetoresistance elements, and hence the element of this invention is of particular utility when employed in low-intensity magnetic fields of less than 1 kilogauss. Further, since it exhibits negative magnetic resistance characteristic, it can be put to new uses based on such a characteristic. By constructing a bridge circuit 110 with the magnetoresistance element 101 of this invention and resistor elements R1, R2 and R3 as illustrated in FIG. 3A, a four-terminal network can be obtained which is analogous to the conventional Hall element. It has been found that the relationship between the magnetic field intensity and the output in the above case is as shown in FIG. 4. Curves 111, 112 and 113 indicate output voltages produced across terminals $b_1$ and $b_2$ in response to the magnetic field intensity when voltages such as 6 v., 9 v. and 12 v. are respectively applied to the bridge circuit 110 across its terminals $a_1$ and $a_2$. It appears from the graph that the bridge circuit 110 exhibits enhanced sensitivity 100 to 1000 times that of the conventional Hall element obtainable in a magnetic field of about 1 kilogauss. Thus, by connecting the output of the magnetoresistance device to input terminal 96 of the control device 95 to control the magnetic field, an oscillator or feedback amplifier may be obtained. This connection may be made through switch S1 as shown in FIG. 1. This result may also be obtained with the other forms of this invention to provide a new and novel oscillator or amplifier.

Further, where the resistor elements R1, R2 and R3 are replaced with the magnetoresistance elements 101 of this invention in the bridge circuit 110, as shown in FIG. 3B, the sensitivity of the circuit 110 can be further enhanced and the circuit 110 does not become unbalanced in response to the voltage and temperature variations.

The combined use of the magnetoresistance element with a transistor, silicon-controlled rectifier or other solid state elements will readily provide a magnetic switch or other circuits. It will also be possible to employ the magnetoresistance element of this invention as a circuit element of an integrated circuit.

While the foregoing example employs the germanium substrate, it will be seen that a substrate formed of a semiconductor material such as Si, Ga–As alloy or the like can be used.

Figure 5:
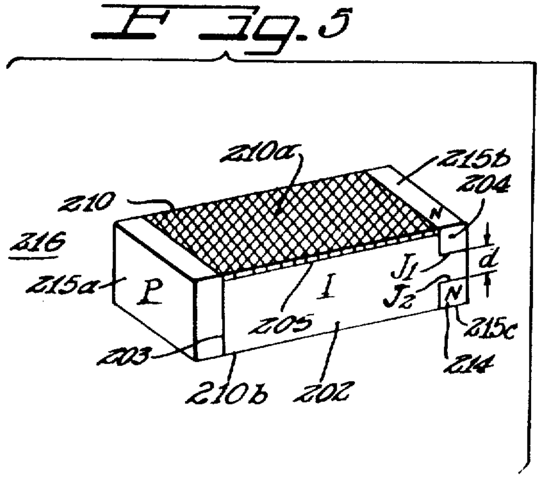
FIG. 5 is an enlarged perspective view illustrating another example of the magnetoresistance element of this invention.

FIG. 5 illustrates another example of this invention, in which reference numeral 216 indicates generally a semiconductor device formed from an intrinsic semiconductor substrate 210. In the present example a first N-type region 204 is formed on that surface 210*a* of the substrate 210 on which a recombination region 205 is provided, and a second N-type region 214 is formed, for example, on the opposite side 210*b* from the surface 210*a* at a predetermined distance *d* from the first N-type region 204, as illustrated in the figure. A P-type region 203 is provided on the other end face of the substrate 210 in opposing relation to the N-type regions. The formation of the N-type regions 204 and 214 may take place by alloying, diffusion or epitaxial growth of, for example, an Sn–Sb alloy as in the formation of the N-type region 104 of the aforementioned magnetoresistance element 101. The N-type regions 204 and 214 form two junctions J1 and J2 in an I-type region 202 into which carriers can be sufficiently injected. This provides a transistor element 216 which might be called an N–I–N type and in which the junctions J1 and J2 are emitter and collector junctions, the region 202 is a base region and the N-type regions 204 and 214 are emitter and collector regions.

With such an arrangement as has been described above, the magnetoresistance element and the transistor elements are both formed on the intrinsic semiconductor substrate 210. The semiconductor device 216 of this invention described with FIG. 5 is symbolically shown in FIG. 6 for convenience in the following description, in which reference numerals 215*a*, 215*b* and 215*c* designate terminals connected to the regions 203, 204 and 214.

Figures 6, 7:
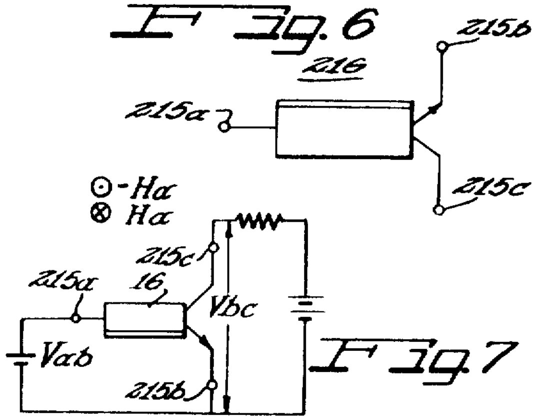
FIG. 6 is a symbolic diagram of the magnetoresistance element depicted in FIG. 5.
FIG. 7 is a schematic diagram of the magnetoresistance element shown in FIG. 5.
Figure 8:
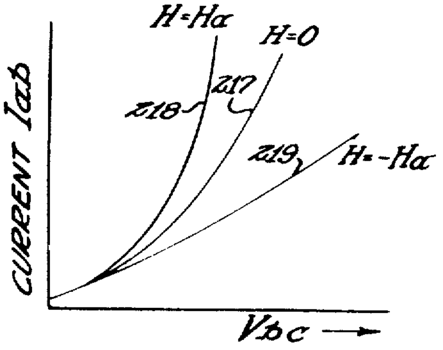
FIGS. 8 and 9 are characteristic curves of the magnetoresistance element of this invention.
Figure 9:
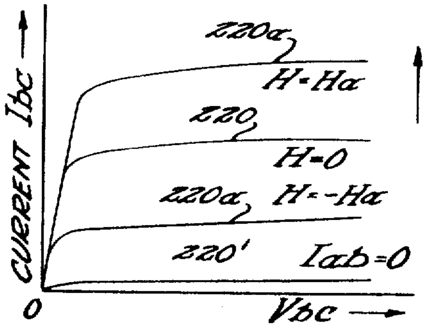

A description will be given in connection with the electrical characteristics of the semiconductor device 216 of such a construction as has been described above. Assume that a voltage V*ab* is applied across the terminals 215*a* and 215*b* or both electrodes of the magnetoresistance element 201 and that a voltage V*bc* is fed across the terminals 215*b* and 215*c* or the collector and emitter of the transistor element, as illustrated in FIG. 7. In such a case, a current I*ab* emanating from the terminal 215*a* of the semiconductor device 216 in response to the voltage V*ab* exhibits a characteristic as depicted in FIG. 8. In this figure a curve 217 represents a voltage-current characteristic exhibited in the absence of a magnetic field, a curve 218 shows a voltage-current characteristic when the device 216 is subjected to a magnetic field $H_A$ of such a direction that the carriers passing through the intrinsic region 202 are deflected away from the recombination region 205, and a curve 219 represents a voltage-current characteristic when the device 216 is subjected to a magnetic field $-H_A$ acting in a direction opposite to that of the magnetic field $H_A$. While, a current I*bc* between the terminals 215*b* and 215*c* of the semiconductor device 216 exhibits such characteristics as shown in FIG. 9 in response to the voltage V*bc*. In the figure a curve 220 represents a voltage-current characteristic obtained in the absence of a magnetic field, curves 220A and 220A' are voltage-current characteristic curves which the device 216 is subjected to the magnetic fields $H_A$ and $-H_A$, namely voltage-current characteristic curves resulted when the current I*ab* increases and decreases. Reference numeral 220' represents a voltage V*bc*-current I*bc* characteristic curve obtained when the current I*ab* is reduced to zero.

In accordance with this invention the characteristic of the semiconductor element combined with the magnetoresistance element, namely the transistor in this example, can be varied with the magnetic field as described above with FIG. 9 while at the same time maintaining the flatness of the characteristic inherent to the semiconductor element.

Figure 10:
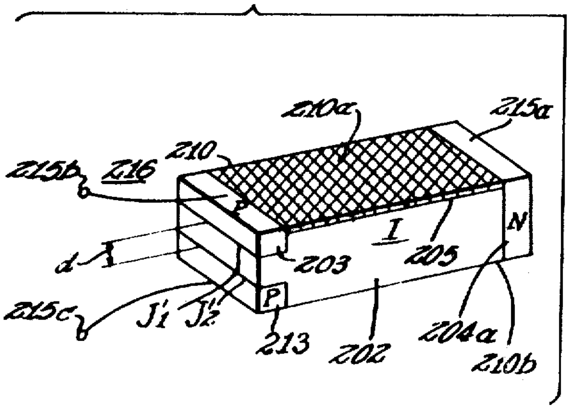
FIG. 10 is an enlarged perspective view illustrating another example of the magnetoresistance element of this invention.

In the foregoing example the semiconductor device 216 consists of the N–I–N-type transistor element and the magnetoresistance element in combination. However, it is also possible to constitute a P–I–P-type transistor element such as depicted in FIG. 10, in which a P-type region 213 is formed opposite to the P-type region 203 of the magnetoresistance element to form junctions J1' and J2' between the P-type regions 203 and 213 and the intrinsic region 202 respectively, the junctions J1' and J2' are provided as emitter and collector junctions and the intrinsic region 202 and the P-type regions 203 and 213 are provided as base, emitter and collector regions respectively. The semiconductor device 216 of such construction is symbolically shown in FIG. 11.

In the semiconductor devices 216 shown in FIGS. 5 and 10 the emitter and collector regions 204, 214 and 203, 213 are provided on the sides 210*a* and 210*b* of the semiconductor substrate 210 respectively. It will be possible, however, to form the device 216 in the so-called planar-type construction such that the regions 203, 213, 204 or 203, 214, from which the terminals of the transistor element and the magnetoresistance element are provided on one common side, for example, 210*a* of the substrate 210.

Figure 12:
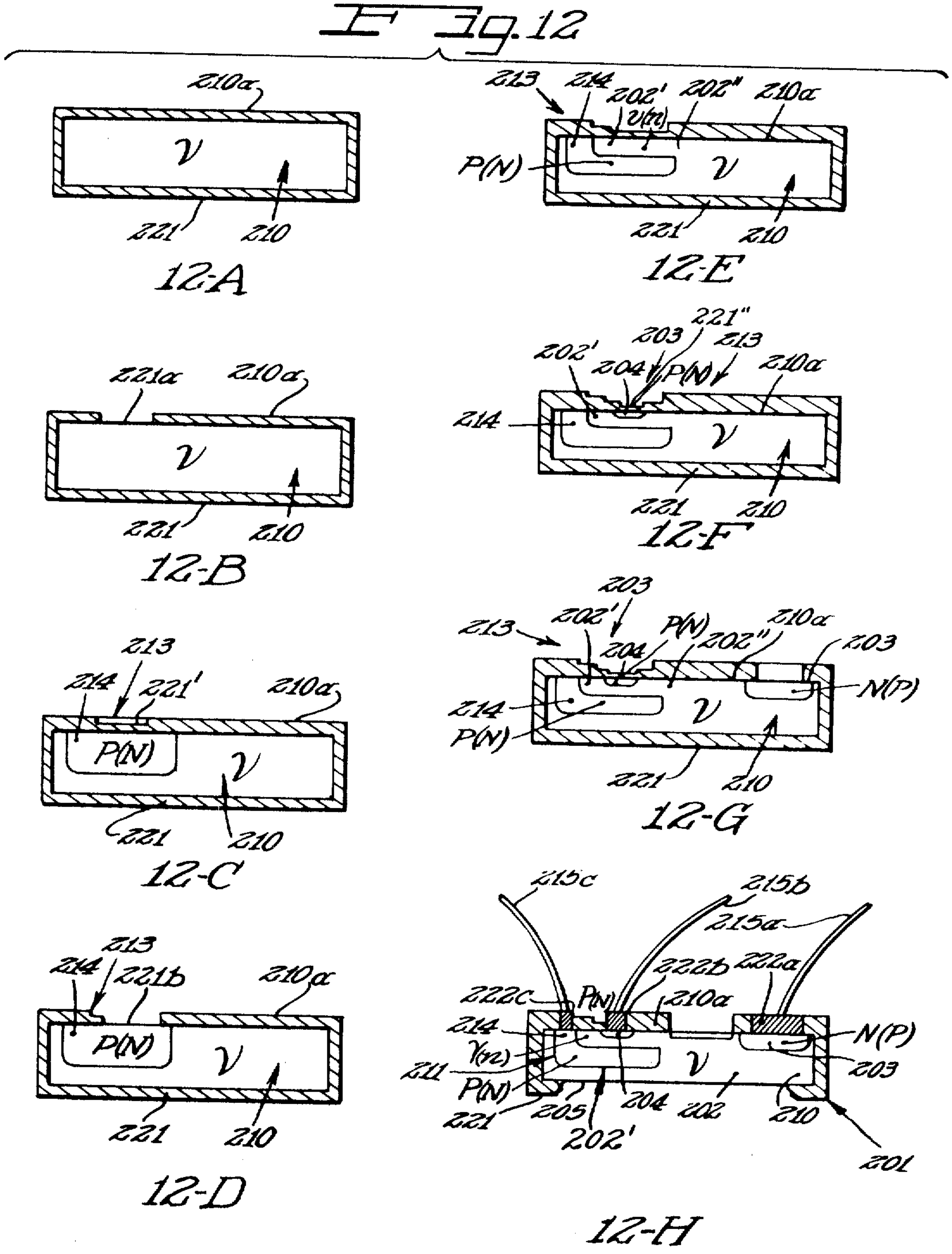
FIGS. 12A to 12H, inclusive, illustrate a sequence of steps involved in the making of the magnetoresistance element of this invention.

FIG. 12, composed of FIGS. 12A to 12H, illustrates a sequency of steps involved in the manufacture of a semiconductor device of this invention in the so-called planar-type construction using a silicon substrate. The manufacture begins with the preparation of the so-called γ-type silicon substrate 210 into which carriers can be sufficiently injected and whose impurity concentration is so low as to permit the formation of an intrinsic region 202 of the magnetoresistance element. The silicon substrate 210 is covered over its entire surface with an insulating film 221 formed of $SiO_2$ by thermal decomposition, vapor deposition, surface oxidation or the like, as illustrated in FIG. 12A. The insulating film 221 on one surface 210*a* of the silicon substrate 210 is selectively removed by photoetching techniques or the like to provide a window 221*a* as shown in FIG. 12B. Following this, an impurity of, for example, P-type conductivity is diffused into the silicon substrate 210 through the window 221*a* to provide a P-type region 214 which will ultimately form, for instance, the collector region of a transistor element desired to be produced, as depicted in FIG. 12C. Thereafter, an insulating film 221', newly formed after the diffusion treatment for the formation of the region 214, is selectively removed by, for example, photoetching as in the foregoing to provide a window 221*b*, as depicted in FIG. 12D. An impurity of the conductivity type opposite to that of the region 214, namely N-type impurity in this example, is diffused into the P-type region 214 and partially into the region 202. In this case, the diffusion concentration of the impurity is selected small so that the so-called γ-type region 202' is formed as illustrated in FIG. 12E. Following this, a selected area of an insulating film 221'' formed on the region 202' is removed by photoetching to provide a window, through which an impurity of the same conductivity type as that of the region 214 is diffused into the region 202' to provide a P-type region 204 exposed on the surface 210*a*, which will ultimately serve as the emitter region of the finished transistor element and as one electrode of the magnetoresistance element, as depicted in FIG. 12F. Then, one selected area of the insulating film 221 on the other portion of the surface 210*a* of the silicon substrate 210 is similarly removed by photoetching to provide a window, through which an N-type impurity is diffused into the silicon substrate 210 to provide an N-type region 203 which will ultimately serve as the other electrode of the finished magnetoresistance element, as shown in FIG. 12G. The formation of the N-type region 203 may take place prior to the formation of the regions 214, 202' and 204 or simultaneously with the formation of the region 202'. After this, the insulating film 221 on the surface 210*a* or the underface 210*b* of the silicon substrate 210 is selectively removed to provide a recombination region 205 (refer to FIG. 10). Thus, a semiconductor device 216 of this invention is provided which comprises the transistor element 211 formed by the regions 204, 202' and 214 and a magnetoresistance element 201 formed by the regions 202, 202' and 203, into which carriers can be sufficiently injected, and the N-type region 203, as illustrated in FIG. 12H.

With such an arrangement as described above, the regions 203, 204 and 214, from which terminals 215*a*, 215*b* and 215*c* of the magnetoresistance element 201 and the transistor element 211 are led out, are exposed on the common surface 210*a* of the silicon substrate 210. This construction facilitates formation of electrodes on the regions for terminals by, for example, vapor deposition and enhances its withstand voltage because the junctions are all covered with the insulating film 221 and hence are not exposed directly to the outside. Reference numerals 222*a*, 222*b* and 222*c* designate ohmic contact electrodes which are formed by partial removal of the insulating film 221 on the regions 203, 204 and 214 and through which lead wires 215*a*, 215*b* and 215*c* serving as terminals are connected to the regions 203, 204 and 214.

While the recombination region 205 is formed subsequent to the formation of the regions 203, 204 and 214 in the foregoing example, it will be seen that various modifications such as the formation of the recombination region prior to that of those regions can be made.

In the foregoing example of the method for the manufacture of the semiconductor device 216, the magnetoresistance element 201 and the P–I–P-type transistor element are combined, but it will be easily understood that the magnetoresistance element can similarly be combined with an N–I–N-type transistor element, as indicated by reference characters in parentheses in FIG. 12.

As has been described in the foregoing, the present invention provides the semiconductor device 216 by the combination of the magnetoresistance element 201 with the transistor element 211, and the semiconductor device has transistor characteristics which can be varied with magnetic fields applied thereto.

In order to facilitate a better understanding of this invention, one example of circuits using such a semiconductor device will hereinbelow be described with reference to FIGS. 13 to 17.

Figure 13:
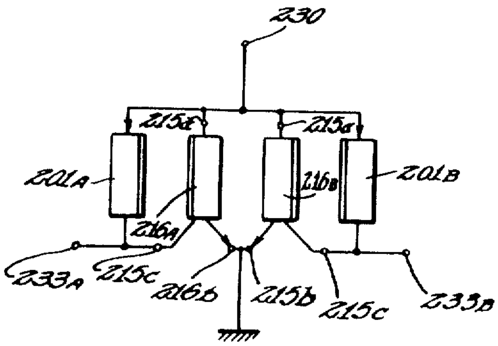
FIGS. 13, 15 and 17 are schematic diagrams illustrating circuits employing the magnetoresistance element of this invention.
Figure 14:
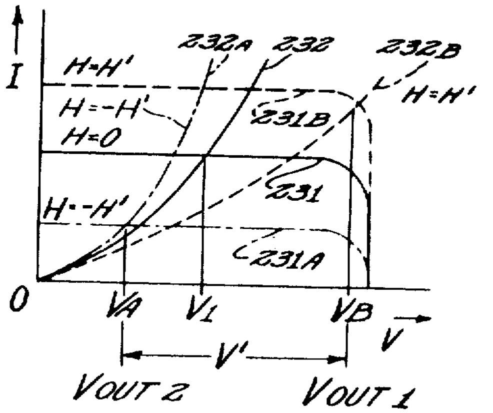
FIGS. 14 and 16 are characteristic curves, for explaining the circuits exemplified in FIGS. 13 and 15.

Referring now to FIG. 13, a description will be given of one example of a circuit adapted to control the output voltage in accordance with magnetic fields applied thereto by the employment of the semiconductor device of this invention. Provided a magnetic field is to be applied in a direction normal to the sheet, two semiconductor devices 216A and 216B of this invention constructed as disclosed and described with reference to FIGS. 5, 6 and 7 and being opposite in magnetic characteristics are connected to a common power source 230 through their terminals 215*a* while being grounded through terminals 215*b*. Between terminals 215*c* of the semiconductor devices 216A and 216B there are connected magnetoresistance elements 201A and 201B which are of the same construction as the magnetoresistance element 101 previously described with FIG. 1 and exhibit magnetic characteristics opposite to those of the devices 216A and 216B in the presence of the aforementioned magnetic field. For example, device 201A is formed with a region for increased recombination on the right of its centerline relative to FIG. 13 and device 216A is formed with a region for increased recombination on the left of its centerline relative to FIG. 13. Device 201B has a region for increased recombination on the left relative to FIG. 13 and device 216B has a region for increased recombination on the right relative to FIG. 13. It is to be noted that devices 210A and 201B comprise loads for devices 216A and 216B, respectively. If now the static characteristic of the devices 216A and 216B and the load of the elements 201A and 201B are as shown by curves 231 and 232 in FIG. 14 and their operating voltage is at $V_1$ in the absence of a magnetic field, the application of a magnetic field H' normal but opposite to H to the sheet in FIG. 13 causes variations in the characteristic of the devices 216A and 216B as indicated by curves 231A and 231B in FIG. 14 and this magnetic field H' also causes variations in the loads of the elements 201A and 201B as represented by curves 232A and 232B in the figure. As a result of this, the operating points of the devices 216A and 216B are shifted and voltages $V_A$ and $V_B$ are taken out from terminals 233A and 233B. Accordingly, a voltage V' appearing across the terminals 233A and 233B is given by $V'=V_B-V_A$, as is apparent from FIG. 14. It will be seen that the voltage $V'$ varies with the magnitude of the magnetic field H or H' and the polarity of the voltage $V'$ varies if the direction of the magnetic field is reversed.

Figure 11:
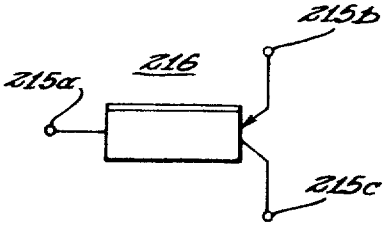
FIG. 11 is a symbolic diagram of the magnetoresistance element depicted in FIG. 10.
Figures 15, 16:
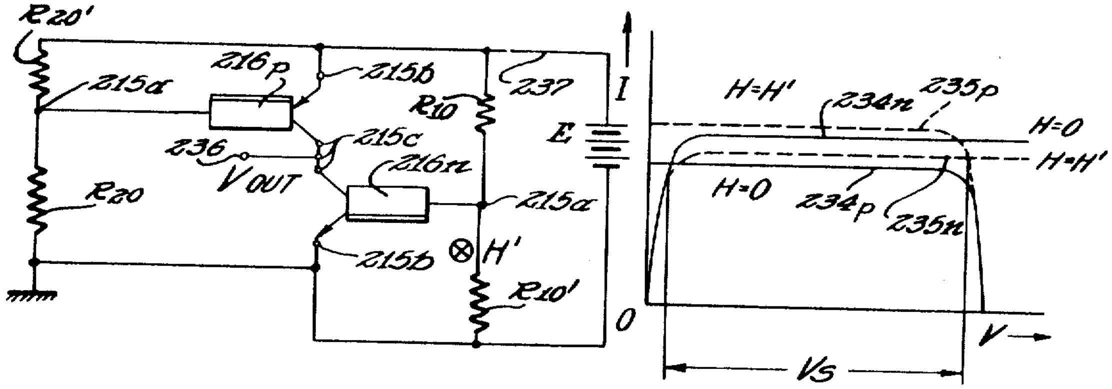

FIG. 15 illustrates an example which employs transistor elements of different conductivity types such as illustrative in FIGS. 7 and 11, for example, wherein the element 216*p* is formed with a single N-type and two P-type regions and the magnetoresistance element 216*n* is formed with two N-type regions and a single P-type region. The element 216*p* is symbolized by an inward arrow and the element 216*n* is symbolized by an outwardly directed arrow. The elements 216*n* and 216*p* are connected as shown in FIG. 15. A resistor R10 is connected between the terminal 237 and 215*a* of element 216*n* and a bias source comprising a battery E is connected between terminal 237 and 215*b* of element 216*n*. Resistor R10' is connected between 215*a* and 215*b* of 216*n*. A resistor R 20 is connected between the terminal 215a of element 216p and terminal 215b of element 216n. Resistor R20′ is connected between 215a and 215b of 216p. The magnetoresistance elements 216p and 216n, respectively, exhibit a characteristic similar to that shown in FIG. 8 and magnetosensitive elements 216p and 216n provide for enhanced sensitivity to a magnetic field. In one of the transistors, the current between terminals 215b and 215c decreases in the presence of a plus magnetic field and the current increases in the presence of a negative magnetic field. Consequently a complementary circuit as illustrated in FIG. 15 results in transistor elements 216p and 216N which have current voltage characteristics that vary in opposite directions when a magnetic field is applied thereto and the voltage change at the output terminal 236 can be made to vary from substantially 0 to a value equal to almost the source E with a magnetic field of only several hundred gausses.

Assuming that the characteristics of the semiconductor devices, 216p and 216n are as shown by curves 234p and 234N in FIG. 16 in the absence of the magnetic field H and that the characteristics are varied, as indicated by curves 235p 235n in the figure, by the application of a magnetic field H′ in a direction normal to the sheet in FIG. 15, there is obtained at a terminal 236 a voltage $V_S$ VS in the form of voltage variation which is determined by the intersecting points of the curves 234p and 234n or 235p and 235n accordingly, as the magnetic field H′ is applied or not. Thus, an applied magnetic field having components normal to the sheet in FIG. 15 will increase the equivalent resistance through one of the devices 216p or 216n while decreasing the equivalent impedance through the other because of the positions of the recombination regions as shown in the figure. A reversal of the magnetic field will cause the impedance across the devices 216p and 216n to change so that the one with the field of opposite direction which had an increased impedance will have a decreased impedance and the one which had a decreased impedance will have an increased impedance. This enables switching operation of the voltage in accordance with the presence of the magnetic field. Thus, the circuit of FIG. 15 allows the presence of a np—*magnetic field to be detected, for example. Alternatively, the voltage which is switched by the application of a magnetic field may be used to control an output device so that a magnetically controlled output is obtained.*

Figure 17:
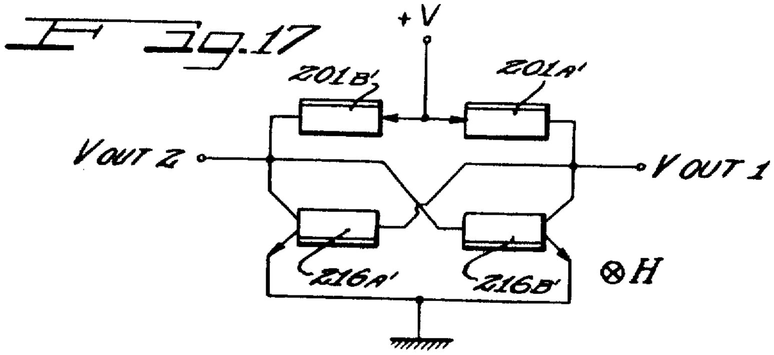

In FIG. 17 there is illustrated another example in which semiconductor devices 216A′ and 216B′ of this invention as described with respect to FIGS. 5, 6 and 7, and magnetoresistance elements 201A′ and 201B′ of the same construction as that previously described with FIG. 1 constitute a flip-flop circuit capable of being controlled by magnetic fields applied thereto. The devices 216A′ and 216B′ are mounted as shown in FIG. 17 so that a magnetic field H normal to the plane of the drawing will cause the impedance through one of the devices 216A′ and 216B′ increase and the impedance through the other to decrease. This allows the flip-flop circuit thus formed to be switched such that the voltages at terminals V out 1 and V out 2 are controlled by an applied magnetic field. Thus, an applied magnetic field controls the output of the flip-flop circuit or alternatively the presence of a magnetic field may be detected. It will be seen that the semiconductor device of this invention is applicable to other various circuits.

While the present invention has been described chiefly in connection with examples in which the magnetoresistance element and the transistor element are combined in expressions in such a manner that the base and emitter of the transistor element serve as components of the magnetoresistance element, it will be apparent that this invention enables the making of a semiconductor device having a predetermined characteristic which is variable with magnetic fields by the combination of the magnetoresistance element with other various semiconductor elements, especially various switching elements.

Figure 18:
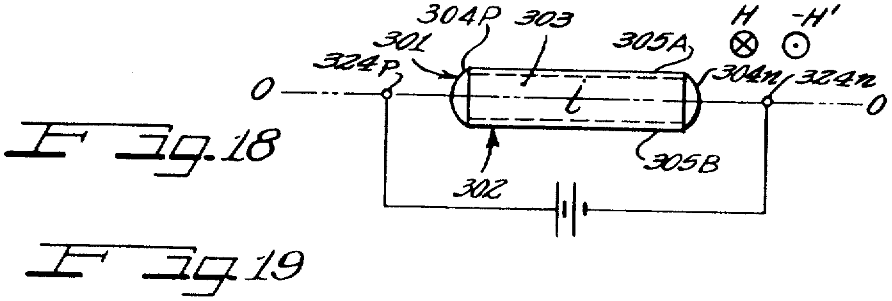
FIG. 18 is a cross-sectional view schematically illustrating another example of the magnetoresistance element of this invention.

FIG. 18 schematically illustrates another example of this invention. As shown in the figure, a germanium substrate 302 is prepared into which carriers or holes and electrons can be sufficiently injected and which is intrinsic at room temperature. The germanium substrate 302 is configured in a rectangular parallelepiped shape which is 1 mm. in thickness T and in width W and is 5 mm. in length L, but these dimensions may, of course, be selected in accordance with the characteristic of an element desired to be obtained. A semiconductor region 303 is provided through which injection of the carriers into the germanium substrate 302 can be well effected, and further there are provided on both end faces of the substrate 302 in its lengthwise direction P- and N-type regions 304p and 304n of relatively high-impurity concentration which facilitates efficient injection of the carriers into the substrate 302. The formation of the P- and N-type regions 304p and 304n may take place by alloying an In–Ga alloy on one end face of the substrate 302 and an Sn–Sb alloy on the other end face as described in the foregoing.

Further, two recombination regions 305A and 305B are formed on a pair of confronting sides of the substrate 302 in such a manner that the regions 305A and 305B face each other about substantially the central axis O—O of the passages of the carriers in the semiconductor region 303 between the P- and N-type regions 304p and 304n.

In this invention the recombination regions 305A and 305B are formed by diffusing from the surface of the semiconductor 301 an impurity such, for example, as Au, Cu, Ag, Zn, Mn, Fe, Ni, Pt or the like which provides recombination centers. The impurity concentrations of the recombination regions 305A and 305B, for example, the surface concentrations $N_A$ and $N_B$ of the regions are selected, for instance, $10^{18}$ atoms/cm.$^3$.

A forward voltage is applied to the semiconductor element 301 of the above-described construction, namely a positive potential is fed to a terminal 324p of the P-type 304p and a negative potential is fed to a terminal 324n of the N-type region 304n. This leads to injection of holes from the P-type region 304p and electrons from the N-type region 304n into the semiconductor region 303, which causes conductivity modulation to produce a great current flow. Under such conditions, when the semiconductor region 303 is subjected to a magnetic field H in a direction substantially at right angles to the current flow direction and parallel with the regions 305A and 305B, the electrons and holes are deflected in the same direction. In this case, if the magnetic field H is selected in such a direction that the electrons and holes are deflected toward one recombination region, for example, 305A, the deflected electrons and holes are rapidly recombined with one another to decrease the current and increase the resistance.

When the semiconductor digital 301 is subjected to a magnetic field —H which is opposite in direction to the magnetic field H to direct the carriers toward the recombination region 305B, the current passage generally goes away from the region 305A but approaches the region 305B, so that destruction of the carriers in the region 303 increases as described in the foregoing to shorten the mean carrier life. This decreases the current, and hence increases the magnetoresistance.

If the areas, shapes and impurity concentrations of the recombination regions 305A and 305B are selected suitable and the regions are positioned symmetrically with respect to the planes including the center axis 0—0 of the carrier passages and the direction of the magnetic field H or —H crossing at right angles to the center axis O—O, the mean carrier life can be made constant under the magnetic fields H and —H. Namely, the resistance variation ΔR caused by the magnetic fields H and —H is minimum in the absence of the magnetic field and presents a symmetrical characteristic in response to the magnetic fields H and —H, as indicated by the curve 306b in FIG. 19A.

The semiconductor element of such a magnetic field-resistance characteristic as indicated by the curve 306b is applicable to, for example, measurement of the magnetic field intensity. In this case, if the direction of the magnetic field is selected to be at right angles to the carrier passages in the absence of the magnetic field to deflect the carriers toward the recombination region 305A or 305B, the magnetic field intensity can be known by measuring the resistance of the element 301 independently of the direction of the deflected carriers. Further, the semiconductor element 301 of this invention enables switching operation of circuits by magnetic fields. That is, the element 301 has its minimum value in the magnetic field-resistance characteristic curve 306 depicted in FIG. 19A, so that a circuit used can be held, for instance, in the on state only in the presence of a magnetic field presenting the minimum value, namely in this example, magnetic fields H' and −H' which produce a resistance within a predetermined resistance variation ΔR'.

In addition, the element 301 can be employed for converting other magnetic signals into electrical ones, namely, the element 301 exhibits the same magnetic field-resistance characteristic in the presence of opposite magnetic fields in the same direction, so that if an alternating magnetic field is applied to the element 301, an electrical signal due to resistance variation can be obtained from the element 301 at a frequency twice that of the alternating magnetic field.

Figures 19, 20:
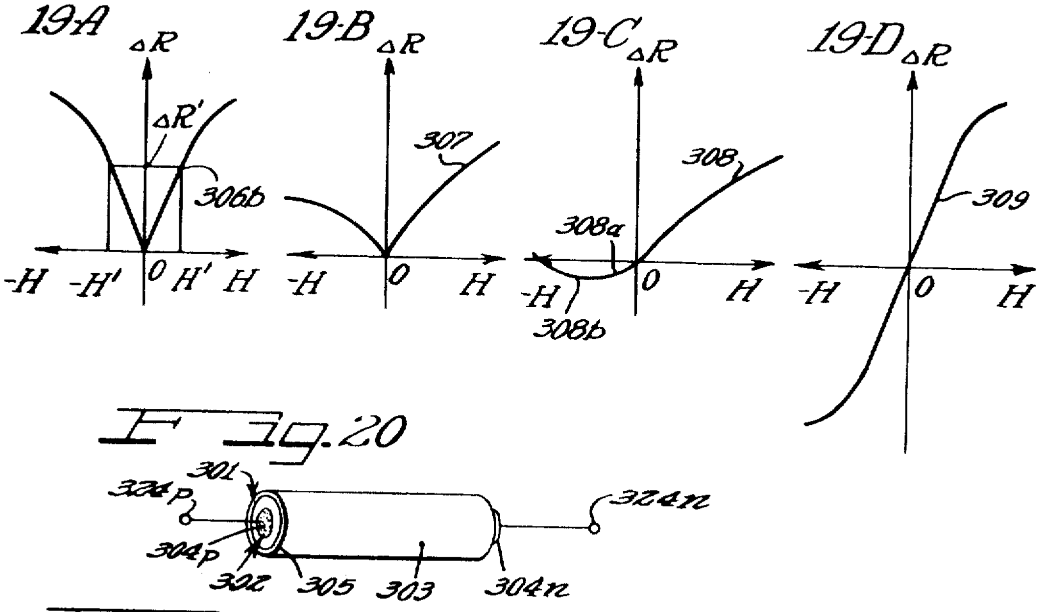
FIG. 20 is an enlarged perspective view illustrating another example of the magnetoresistance element of this invention.

In the foregoing example a pair of recombination regions 305A and 305B are formed symmetrically with respect to the center axis of the carrier passages formed in the absence of a magnetic field, but a plurality of pairs of recombination regions can be formed symmetrically with respect to the center axis of the carrier passages. Further, it is also possible that the semiconductor element 301 may be shaped in a cylindrical configuration and that a recombination region 305 may be formed over the entire surface of a region 203 permitting sufficient injection of carriers therethrough and having the P- and N-type regions 304*p* and 304*n* formed on the both end faces thereof, as illustrated in FIG. 20. With such an arrangement, if the magnetic field-resistance characteristic of the semiconductor element 301 is such that the magnetic field crosses the center axis O—O of the carrier passages, the element 301 presents isotropy in any magnetic field. Therefore, the semiconductor element is suitable for use in measuring only the magnetic field intensity irrespective of the direction of the field.

In the foregoing example the recombination regions are symmetrically positioned at substantially an equal distance from the center axis O—O of the carrier passages to produce a magnetic field-resistance characteristic which is symmetrical as indicated by the curve 306 in FIG. 19A. However, it is also possible to obtain an asymmetrical magnetic field-resistance characteristic by positioning the recombination regions asymmetrically with respect to the center axis O—O of the carrier passages. Namely, in this case the means carrier life is different in the recombination regions 305A and 305B. In other words, the recombination velocity of the carriers in one region, for example, 305A is selected smaller that in the other region 305B. For this purpose, the surface concentration of the impurity forming the recombination centers in the region, for example, 305A, is selected as $10^{15}$ atoms per cubic cm. and that in the region 305B, is selected as $10^{14}$ atoms per cubic cm. With such an arrangement, when the element 301 is subjected to a magnetic field H applied normal to the sheet in FIG. 18 to deflect the carriers toward the recombination region 305A, the mean carrier life becomes shortened to increase the resistance as described previously and the element 301 exhibits a characteristic such as indicated by a curve 307 in FIG. 19B, which is substantially equal to that obtained with the magnetic field H which is indicated by the curve 306*b* in FIG. 19A. In the presence of the magnetic field −H opposite in direction to the magnetic field H, the carriers are deflected toward the other region 305B to similarly shorten the means carrier life, but since the recombination velocity in the region 305B is selected smaller than that in the region 305A, the ratio of resistance increase is lower than that obtainable with the magnetic field H.

Further, when the recombination velocity in the region 305A is made substantially smaller than that of the region 305B, and for instance, the surface concentration of an impurity forming the recombination centers in the region 305A is selected to be $10^{15}$ atoms per cubic cm. and that of the other region 305B is $10^{13}$ atoms per cubic cm., application of a magnetic field H, such as is normal to the sheet and deflects the carriers toward the region 305A, results in a characteristic such as indicated by a curve 308 in FIG. 19C which is similar to that obtained with the magnetic field H, indicated by the curve 306 in FIG. 19A, for the same reasons as in the foregoing examples. Upon application of the magnetic field −H opposite in direction to the magnetic field H, the carriers are deflected toward the other regions 305B. In this case, however, the recombination velocity in the region 305B is selected sufficiently smaller. Hence, so long as the intensity of the magnetic field −H is relatively low, the carriers are not so much influenced by the region 305B but subjected to an influence that as the carriers go away from the region 305A destruction of the carriers decreases. Therefore, the mean carrier life becomes long and the resistance becomes lower than that present in the absence of a magnetic field, as indicated by the portion 308*a* of the curve 308. When the intensity of the magnetic field −H is increased, the carriers are destroyed in the region 305B, and hence the resistance increases as indicated by the portion 308*b* of the curve 308.

In any of the above examples the magnetic field-resistance characteristic curve has a minimum value as represented by the curve 308 and consequently the element can also be used for switching operation by the magnetic field in a similar manner to that with the element having the characteristic of FIG. 19A.

In the foregoing examples the magnetic field-resistance characteristic has the minimum value, but when one region 305B is not formed, the destruction of the carriers decreases as the carriers go away from the recombination region 305A, so that the resistance decreases and the magnetic field-resistance characteristic curve becomes as indicated by a curve 309 in FIG. 19D.

It will be seen that a plurality of recombination regions can be provided on the surfaces of a polygonal column (or post) about the center axis O—O in the element 301. Although cylindrical shape has been illustrated, it is to be realized that members of other cross-sectional forms may be used.

Figure 21:
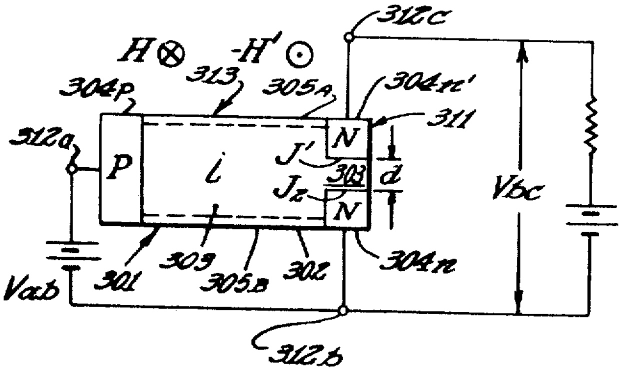
FIG. 21 is an enlarged cross-sectional view illustrating still another example of the magnetoresistance element of this invention.

While the present invention has been described as applied to the so-called magnetoresistance element whose resistance varies with a magnetic field applied thereto, the invention is applicable to a compound semiconductor element constructed by the combined use of the magnetoresistance element and a semiconductor element such as a transistor. One example of such construction is illustrated in FIG. 21, in which reference numeral 313 designates generally a compound semiconductor element. In this case a magnetoresistance element 301 is provided on a semiconductor substrate 302 as previously described with FIG. 18, and an N-type region 304*n* is formed on one side of one end face of the substrate 302 and another N-type region 304*n'* is provided at a predetermined distance *d* from the N-type region 304*n*. The formation of the N-type regions 304*n* and 304*n'* may take place by means of alloying, diffusion or epitaxial growth of, for example, an Sn–Sb alloy in the same manner as that for the formation of the N-type region 304*n* of the aforementioned magnetoresistance element 301. The N-type regions 304*n* and 304 *n'* provide two junctions J1 and J2 in the so-called I-type region 303 into which the carriers can be sufficiently injected. In this manner, a transistor element 311 is provided which might be called N–I–N-type and in which the junctions J1 and J2 serve as emitter and collector junctions, the region 303 as a base region, and the N-type regions 304*n* and 304*n'* as emitter and collector regions respectively.

According to the above construction, the magnetoresistance element 301 and the transistor element 311 are combined with the common semiconductor 302. Reference numerals 312*a*, 312*b* and 312*c* indicate terminals led out from the regions 304*p*, 304*n* and 34*n'* of the semiconductor element 313 respectively.

Figure 22:
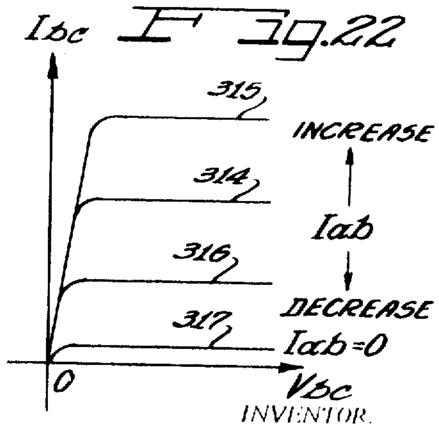
FIG. 22 is a characteristic curve, for explaining the magnetoresistance element depicted in FIG. 21.

A description will be given of the electrical characteristic of the semiconductor element 313 of such a construction just described above. If now a voltage V*ab* is applied across the terminals 312*a* and 312*b* of the element 313, namely across the magnetoresistance element 301 and a voltage V*bc* is fed across the terminals 312*b* and 312*c*, namely across the collector and emitter of the transistor element 311, the current I*bc* flowing across the terminals 312*b* and 312*c* of the element 313 exhibits a characteristic such as shown in FIG. 22 in response to the voltage V*bc*. In the figure, reference numeral 314 represents V*bc*–I*bc* characteristic curve obtained in the absence of a magnetic field, 315 a V*bc* –I*bc* characteristic curve obtained when a magnetic field is applied to the element 313 to decrease the resistance of the element 301 and hence increase the current I*ab* flowing across the terminals 312*a* and 312*b*, and 316 a V*bc*–I*bc* characteristic curve obtained when the resistance of the element 301 is increased by the application of a magnetic field to decrease the current flowing across the terminal 312*a* and 312*b*. Reference numeral 317 identifies a V*bc*–I*bc* characteristic curve resulted when the current I*ab* is zero.

In accordance with this invention the element 313 exhibits a characteristic variable with an applied magnetic field while maintaining the flatness of the characteristic inherent to the semiconductor element, namely in this example the transistor element combined with the magnetoresistance element, as previously described with FIG. 22.

Although the present invention has been described as applied to the combination of the N–I–N-type transistor element and the magnetoresistance element, it will be possible to construct a compound element consisting of the magnetoresistance element 301 This a P–I–P-type transistor element by forming a P-type region in opposing relation to the P-type region 304*p* of the magnetoresistance element 301 in such a manner that the P-type region 304*p* may serve as an emitter region. It will be seen that compound semiconductor elements can be made by the combined use of the magnetoresistance element with other various semiconductor elements.

It has been found that the present invention can provide a semiconductor element whose electrical characteristic varies in response to a magnetic field of about less than 1 kilogauss with high sensitivity.

The present invention has been described in connection with examples in which the semiconductor 302 is formed of germanium, but it will be understood that semiconductors such as silicon, an intermetallic compound and so on can be employed. Further, the reference to the rectangular parallelepiped and cylindrical configurations should not be construed as limiting the shape of the semiconductor 302 specifically thereto and it will be seen that various modifications such as trapezoid in cross section can be made.

In the foregoing the recombination regions are formed by injecting an impurity for the recombination centers by means of diffusion techniques or the like. However, it is possible to enhance the recombination velocity on the surface of the semiconductor 302 by grinding a selected area of the surface thereof with abrasives such as Carborundum to roughen the area, simultaneously with the injection of the impurity. It will also be possible that a portion of great surface area is formed by suitably selecting the shape of the semiconductor 302 in cross section and/or longitudinal section to provide a recombination region.

It is to be particularly noted with respect received FIG. 16 which illustrates the characteristic of the transistor circuit of FIG. 15 that the crossing point of the curves 234*n* and 234*p* corresponding to the left vertical line indicates that a very low voltage occurs on terminal 236 in the absence of an applied magnetic field. On the other hand, the presence of an applied magnetic field. On the other hand, the presence of an applied magnetic field H' into the plane of the sheet relative to FIG. 16 will cause the magnetoresistor 216*n* to have a low impedance because the recombination of carriers will decrease in its recombination region and the curve for this element is indicated by the curve 235*p* in FIG. 16. On the other hand, in the presence of the same magnetic field, the magnetotransistor 216*p* will have an increased impedance and this characteristic illustrated by the curve 235*n* in FIG. 16. The crossing point of curves 235*n* and 235*p* results in an output voltage at 236 which is substantially greater than when there is no field and the voltage difference is VS. A large value of VS may be obtained with a slight difference of H. Thus, this circuit has a good switching characteristic and has high sensitivity.

In this specification the terms magnetoresistance or magnetoresistive resistive means that the resistance of a substance may be changed, varied or controlled by a magnetic field.

It will be apparent that many modifications and variations may be effected without departing from the scope of the novel concepts of this invention.

I claim:

1. A magnetoresistance semiconductor circuit device comprising a first semiconductor transistor device having a region of one semiconductor type and a pair of regions of opposite type of semiconductor material, and a semiconductor material having less carrier concentration than either said one type region or said opposite type regions between said regions of one type and opposite type semiconductor materials, and said region of less carrier concentration having a discrete region of recombination centers different from the remainder of the intermediate region which are asymmetrically located with respect to the center axis of carrier flow, a second semiconductor transistor device having a region of opposite type semiconductor material and a pair of regions of said one type semiconductor material, and a semiconductor material having less carrier concentration than either said one type of said opposite type regions between said regions of one type and opposite type semiconductor materials, said intermediate region having a discrete region of recombination centers different from the remainder of the intermediate region which are asymmetrically located with respect to the center axis of the carrier flow, said first and second semiconductor transistor devices mounted adjacent each other and oriented so that the discrete regions of recombination centers cause in the presence of a magnetic field the carrier flow through one of said semiconductor transistor devices to increase and the carrier flow through the other of said semiconductor transistor devices to decrease, one of said pair of regions of opposite type semiconductor material of said first semiconductor transistor connected to one of said pair of regions of said one type of semiconductor material of said second semiconductor transistor device, and an output terminal connected to said regions of said first and second transistor devices which are connected together.

2. A semiconductor transistor circuit device according to claim 1 wherein said one type semiconductor material is N-type and said opposite type semiconductor material is P-type.

3. A semiconductor transistor circuit device according to claim 1 including a bias source connected between the second one of said regions of opposite type in material of the first semiconductor transistor and the second one of said regions of said one type of semiconductor material of the second semiconductor transistor.

4. A semiconductor transistor circuit device according to claim 3 comprising a first impedance connected between said second one of said regions of opposite type semiconductor material of the first transistor device and said region of opposite type semiconductor material of second transistor device.

5. Apparatus according to claim 3 comprising a second impedance connected between said one type semiconductor material of said first transistor and the second of said pair of one type semiconductor material regions of the second transistor.

6. A semiconductor circuit device comprising a pair of semiconductor transistor magnetoresistance devices, and a pair of semiconductor magnetoresistance diode devices, each of said pair of transistor devices having single regions of one type semiconductor material and each having a of regions of opposite semiconductor material and each having semiconductor material having less carrier concentration than either said one type or said opposite type regions between said regions of one type and opposite type semiconductor materials, a received one of said pair of regions of the one semiconductor type of the first transistor connected to the first one of the pair of regions of said second transistor, each of said diode semiconductor devices having a region of one type semiconductor material and a region of opposite semiconductor materials and having semiconductor material with less carrier concentration than either of said one type region or said opposite type region between said regions of one type and opposite types semiconductor materials, said one type regions of said diodes and said transistors connected together, the region of the first diode of opposite semiconductor material connected to the second one of the pair of regions of opposite semiconductor material of the first transistor, the region of said second diode of opposite material connected to the second one of the regions of opposite material of the second transistor, and each of the regions of less carrier concentration of said two transistor devices and two diodes having discrete regions of recombination centers different from the remainder of the intermediate region and which are asymmetrically located with respect to the center axis of the carrier flow, and said pair of transistors and pair of diodes mounted relative to each other so that the discrete region of recombination centers of the first diode and the second transistor are on the same sides and the discrete region of the recombination centers of the first transistor and second diode are on the same sides such that in the presence of a magnetic field the impedance of the first diode and the second transistor will be changed in the same direction and the impedance of the first transistor and second diode will be changed in the opposite direction.

7. A semiconductor circuit device according to claim 6 counter a pair of output terminals with one of said output terminals connected to the region of opposite type of semiconductor material of the first diode and the other output terminal connected to the region of opposite type semiconductor material of the second diode.

8. A semiconductor circuit device comprising a pair of transistor magnetoresistance devices each having regions of one type semiconductor material and each having a pair of regions of opposite type semiconductor material, and each having regions of semiconductor material having less carrier concentration than either said one type region or said opposite type regions between said regions of one type and opposite type semiconductor materials, a pair of diode semiconductor devices each having a region of one type semiconductor material and each having regions of opposite type semiconductor material having less carrier concentration than either said one type or opposite type regions between said regions of one type and opposite type semiconductor materials, the regions of said one type semiconductor material of said diodes electrically connected together, the region of opposite type semiconductor material of said diodes respectively connected to one of the regions of opposite semiconductor material of said first and second transistors, the second regions of opposite semiconductor material of said transistors connected together, the opposite type semiconductor material of the first diode connected to said region on one type semiconductor material of the second transistor, the region of opposite semiconductor material of the second diode connected to said one type semiconductor material of the first transistor, each of said diodes and transistors formed with discrete regions of recombination centers in said intermediate region and which are asymmetrically located with respect to the center axis of carrier flow, and the diodes and transistors mounted relative to each other such that in the presence of a magnetic field of first direction carriers will be deflected toward the recombination regions of the diodes and away from the recombination regions of the transistors and in a magnetic field of opposite direction carriers will be deflected away from the recombination regions of the diodes and towards the recombination regions of the transistors.